June 17, 1958 G. B. GREENE 2,839,613

MAGNETIC TRANSDUCER HEAD

Filed July 7, 1952

INVENTOR
George B. Greene
BY Lippincott & Smith
ATTORNEYS

United States Patent Office 2,839,613

Patented June 17, 1958

2,839,613

MAGNETIC TRANSDUCER HEAD

George B. Greene, Berkeley, Calif., assignor to Marchant Research, Inc., a corporation of California Application July 7, 1952, Serial No. 297,441

3 Claims. (Cl. 179—100.2)

This invention relates to transducer heads for recording electrical signal trains on, or reproducing such trains from a magnetizable recording medium. While the transducer heads of this invention are especially adapted to record or reproduce pulses of substantially rectangular wave form, they are also applicable for general recording and reproducing purposes, such as the transduction of signals representative of speech or music as well as signals of a special type used for control or resulting from instrumentation.

The requirements for recording rectangular pulses such as are utilized in digital electronic computers are particularly severe. One type of "memory system" utilized for the storage of digital data for such systems is to record the pulses representative of such data on a continuously moving magnetic medium. The medium employed may be a wire, tape, disc, or the surface of a drum. One requirement of a memory system of this character is that as short a time as possible intervene between the time when the stored information is required and the time when it is delivered by the memory for use in the mathematical process involved. Even a moderate sized electronic computer will require that relatively large amounts of data be stored; i. e., the storage system must accommodate not only figures comprising relatively large numbers of digits but must also be able to handle, simultaneously, numerous such numbers.

In one known system pulse trains representative of the data to be stored are recorded magnetically on the periphery of a rapidly rotating drum by a suitable transducer head. These signals are picked up by a similar transducer head, spaced around a periphery of the drum in the same plane as the recording head by a distance somewhat greater than that required for recording the entire pulse train. The reproduced signals are amplified and fed back to the same head through which they were originally recorded, which re-records them on the drum to be picked up again a fraction of a second later, the process repeating indefinitely until such time as the circulating data are required for use in the mathematical process involved. The "access time" which intervenes between the first instant at which the data so memorized or stored can be used and the instant at which it is available is therefore, at a maximum, very slightly more than the maximum length of the signal train itself.

In a data storage system of the type described the size and weight of the system are a direct function of the resolving power of the combination of transducing heads and magnetic medium, defining, as "resolving power," the minimum length of the elementary magnet or cell of magnetization which can be recognized by the system as a separate pulse and not merged with the preceding or succeeding pulse. Mechanical considerations set a limit to the speed with which the drum or other magnetic medium can be progressed past the transducing heads. An increase in resolving power, which is a decrease in the length of the magnetic cell which can be separately recognized, results in a directly proportional increase in the amount of data which may be stored on a specific medium; doubling the number of cells per inch which can be recognized by the pick-up head means that the amount of data stored on a specific drum may be doubled, or alternatively, that the diameter of the drum may be halved and its weight (if solid) reduced to one-fourth, with consequent reduction in the power required to drive it, the size of bearings, and the cost of the mechanism as a whole.

In order to use the high computing speeds of which electronic equipment is capable, it is desirable to use high pulse rates, which implies high surface speeds for the recording medium. In the particular device for which the transducer head of this invention was first designed a drum of 6½ inches diameter is driven at 6000 revolutions per minute, giving a surface speed of almost exactly 170 feet per second. The abrasive effect which would result from actual contact between a transducer head and a drum traveling at any such speed would be extremely high, particularly where the actual recording medium used is a coating of a magnetizable iron oxide; actually a form of rouge, which is customarily used for its abrasive qualities. Therefore, for the specific purpose here involved it is preferable that a minute gap separate the transducing heads from the surface of the medium. The separation necessarily results in some slight spreading of the magnetic lines of force between the head and the medium. The effect of such spreading is to reduce, to some extent, the definition of the individual cells of magnetism constituting the record. There is therefore an engineering compromise to be made between record speed, attainable precision in drum circularity and bearing stability, and the spacing between heads and the surface of the drum. In practice such a spacing of about one mil or 0.001 inch has proved practical.

The type of transducer used with equipment of the class here considered comprises a ferro-magnetic core, generally annular in form, provided with a winding into which the current pulses to be recorded are introduced, thus producing an electro-magnetic flux circulating in the annular core. The core is provided with a gap which interrupts the otherwise substantially complete ferro-magnetic circuit, and the head is mounted with this gap apposed to the recording medium, the direction of the flux through the gap being parallel to the direction of the motion of the medium. The length of the gap (i. e., its dimension in the direction of the flux traversing it) is usually a few thousandths of an inch at most, and may be much less—0.0005 or 0.00025 inch in some instances, while the width of the gap, transverse to its magnetic length, will usually, for structural reasons, be of the order of 0.1 inch. With this structure the direction of the magnetization in the cells produced upon the medium is in the same direction as the motion of the track constituted by such cells.

The production of substantially square pulses at the frequencies of repetition here contemplated (or, more properly, of the duration here contemplated) requires that a winding on the head accept and the flux in the core follow frequencies of the order of several megacycles per second. In order to do this with even reasonable efficiency the core must be comprised of very thin insulated laminations, to prevent high eddy-current losses, and of material having very high initial permeabilities; preferably one of the ferro-nickel alloys of one of the groups which have been marketed under such trade names as "Permalloy," "Mu-metal," or the like. The magnetic properties of these materials are affected to a very high degree by both mechanical and heat treatment. Working of the material, in any manner, such as punching, rolling, or flexing, will cause serious deterioration in permeability and increase in losses, unless the resulting stresses are normalized by heat treatment after the working. For these reasons it has been past practice to form the cores of such heads of flat laminations, stacked with their planes parallel to the direction of motion of the recording medium. The core has usually (but not always) been formed in two halves, each carrying one-half of the winding. The two wound halves have then been assembled with one end in actual abutting contact; the other end has been separated to form the gap. The gap forming ends of the two half cores, have, in past practice, been tapered so that the gap itself has been wedge-shaped, the small end of the wedge and the narrowest portion of the gap being nearest the recording medium so as to produce a maximum concentration of the magnetic field at this portion of the magnetic circuit.

With a given length of gap and separation between gap and recording medium the primary limitation on resolving power of the transducer heads is the spreading of the field beyond the gap dimensions. The lines of force forming "fringe fields" leave the ferro-magnetic circuit of the head itself and enter the portion of the circuit formed by the recording medium some distance on either side of the gap and leave the medium to re-enter the ferro-magnetic circuit of the head on the other side of the gap. The resulting magnetic cell from the medium is therefore not sharply defined but tapers off, longitudinally of the track, in each direction from its nominal position. The resulting magnetization, which might be referred to as its "record wave form," is therefore not the substantially rectangular form desired but tapers off at both ends of the cell to produce a wave form approximating the trapezoidal. Where the tapering edges of two such trapezoidal cells representing magnetization in the same direction overlap, the resulting intensity in magnetization may be very nearly constant and the differentiation between two cells lost, so that what was intended to be recorded as two pulses will be reproduced as a single pulse. The resolving power of any head therefore depends upon the intensity and spread of its fringe fields. Because of the tapering of the conventional form of core adjacent the air gap, resulting in increasing saturation of the core as the gap is approached, and because the permeability of material used in the conventional form is, generally, at least as great if not greater transversally of the material in the neighborhood of the gap as it is longitudinally, the fringe fields of the conventional type of gap are quite pronounced. A wedge-shaped gap produces a concentrated magnetic field but the very concentration is detrimental to resolving power. Moreover, as the reproduced voltage depends on the rate-of-change of the magnetic field, tapered cells may actually develop lower voltages than more abrupt cells of lower intensity.

The broad purpose of the present invention is to provide a transducer head having a maximum resolving power for the width of gap employed. Pursuant to this broad purpose, among the objects of the invention are to provide a transducer head wherein the fringe fields are reduced to a minimum; to provide a transducer head wherein the flux carried by the ferro-magnetic core is supplied with a path of substantially constant reluctance up to the position of the gap itself; to provide a transducer head wherein the reluctance transverse to the desired flux-path through the core is greatly in excess of the reluctance in the direction of the desired path; contributory to the last mentioned object, to provide a core structure for transducer heads wherein the laminations forming the core are substantially parallel to the plane of the recording medium at the point where they are apposed thereto; to provide a transducer head wherein high permeability alloys may be disposed in cylindrical surfaces (as contracted with flat surfaces) without degradation of the magnetic properties of the material; to provide a method of constructing transducer heads which permits the adjustment of the gap to any desired length, and, once adjusted, fixes that adjustment permanently, for the life of the head; to provide a transducer head having a single gap only, so that the reluctance of the core is concentrated almost entirely in the gap and the magneto-motive force developed by the coil is, to a maximum degree, expended in magnetizing the medium rather than exciting the core; to provide a transducer head for use in push-pull circuits wherein the balance between the two halves of the winding is substantially perfect; to provide a transducer head which will respond to frequencies in the megacycle range, so that sharp pulses of substantially rectangular wave form may be accurately reproduced, and, generally, to provide a transducer head which is extremely rugged, neat in appearance and can be adjusted to the precision required for handling pulses representative of mathematical data at the high rates required for electronic computer purposes.

Considered broadly the transducer head of this invention comprises a tightly wound coil of ferro-magnetic tape, the latter being preferably the thinnest obtainable (about 1 mil) and of one of the high permeability alloys that have been mentioned. This coil may be circular or formed in some other general shape such as roughly triangular, so long as the bends at the corners are not too sharp; in any event the resultant core is generally annular in form, consisting of a single spirally wound strip. After winding the core is clipped or bound so as to hold it in its tightly wound condition and, if it be of the preferred material and particularly if it be other than truly circular in form, is heat treated to normalize the stresses produced by the winding.

After the heat treatments the coil is impregnated with an adhesive liquid. The adhesive should be of minimum viscosity and, like all impregnating compounds, should be such as readily to wet the surface of the core. A preferred material for such impregnation is a solution of a thermosetting resin. Various impregnating materials of this character are obtainable in the open market, which will be drawn by capillarity into the very minute interstices between the adjacent layers of the spirally wound core, in spite of the tightness with which it is wound, and form a thin film of insulation between these layers. After impregnation the core is heated to a temperature much below that used for the heat treatment, to evaporate any solvent and set the plastic. When this process is completed the coiled tape core is sufficiently rugged to withstand a reasonable amount of handling.

The next step in formation of the core is to apply the winding. This is applied to one segment of the core only. Preferably enamel insulated wire is used, wound over a layer of plastic, cloth or paper insulating tape, and is conveniently applied by one of the various toroidal winding machines using a shuttle which threads the annular core.

The core is then invested, wholly or partly, in plastic. If the desired air gap is reasonably wide (e. g., 6 mils or more) the investment may include the entire device, core, winding, and all, with the exception of a portion of the circumference of the core where the gap is to be formed. Where a narrower gap is desired only a segment of the core, preferably that directly opposite the winding, is invested. A thermoplastic may be used for this purpose but one of the thermo-setting plastics having low dielectric losses is preferred. In either case the gap is formed by slotting both plastic and core. If the core has been invested only in part this leaves two separate blocks of plastic adherent to the free ends of the core adjacent the gap. In the latter case the two free ends may be flexed toward each other to adjust the length of the gap, the simplest method of determining the latter being the insertion of a shim of the desired dimensions between the free ends. The device is then reinvested, preferably in the same plastic, filling the gap, retaining the flexure which determines the gap length, and constituting the entire device into a solid block, which will withstand any handling to which it may reasonably be expected to be subjected without any damage whatever. Terminals and mounting blocks may be inserted into the mold in which the investment is accomplished. If desired the circumferentially exposed portion of the core at the gap may be honed slightly to insure smoothness and exact parallelism with the recording medium. If the head is one wherein no final adjustment of the gap is necessary the final investment may be limited to a mere re-filling of the gap itself and the mounting means and connecting blocks may be incorporated in the original mold wherein the first investment was accomplished.

All of the above will be readily understood by reference to the ensuing detailed description of a preferred form of head, taken in connection with the accompanying drawings wherein.

Figure 1:
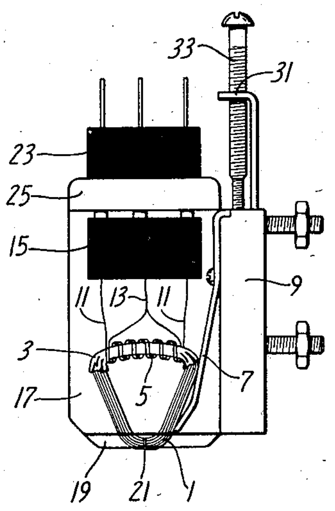
Fig. 1 is a side elevation of a head in accordance with the invention.
Figure 2:
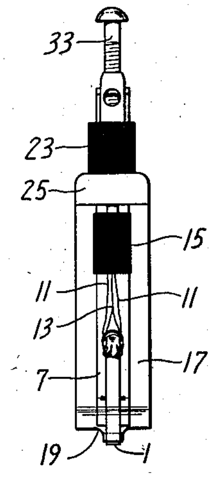
Fig. 2 is an end view of the head of Fig. 1.
Figure 3:
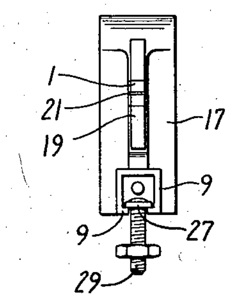
Fig. 3 is a plan view looking toward the exposed and slotted portion of the core.

In this description of the particular invention shown in the drawings the various parts will be described in accordance with their order of manufacture, since the invention is believed to reside in both a method of manufacture and the structure of the core, one depending to a very large degree upon the other. While dimensions are not the essence of the invention, it may be helpful in considering the processes involved, to state that the scale chosen for the drawings of Figs. 1 through 3 is such that in reproduction in the printed patent the figures show the device as approximately full size.

Core 1, in the specific device shown, is wound on a mandrel shaped generally in triangular form as shown, the corners of the triangle being well rounded to avoid sharp bends at the corners. The material of the core is "Mu-metal" tape of 1 mil thickness. Magnetically a circular core has the advantage of producing less serious stresses in the magnetic material, but the triangular core is adopted in this case to permit the passage of the shuttle of a toroidal winding machine and give the minimum length of core and magnetic circuit for the size of the shuttle and the winding employed.

After winding, the coiled core is held in place on the mandrel by a clip or by tying with wire and is subjected to the heat treatment recommended for normalizing the specific magnetic material employed. The precise heat treatment varies with the material. Annealing is performed in a hydrogen or helium atmosphere to prevent any change in the over-all magnetic properties through oxidation.

After normalizing, and with the clip or tie still in place, the core is impregnated with an adhesive material. Various impregnants are available on the market, prepared by various manufacturers. That preferred and used in the device herein described is a thermo-setting resin. Such resins have the advantage that they may be employed in a low state of polymerization or condensation and do not rely entirely upon solvents to reduce their viscosity and increase their wetting properties, although most of the materials available upon the market appear to have some solvent admixture. A material chosen should have very low viscosity and high wetting power so that it will be drawn by capillarity into the very minute interstices between the turns of the coil forming the core. Owing to the extremely minute size of the parts involved, it is difficult to ascertain to what extent such impregnation takes place, but experiment has shown that the various laminae forming the core are sufficiently insulated to prevent serious eddy-current losses. The resultant core, after the resin has set, forms a solid mass well able to withstand the handling to which it is normally subjected.

After impregnation one segment of the core, opposite the apex which is eventually to be slotted to form the gap, is wound with an insulating tape 3 and is then placed in a toroidal winding machine and the magnetizing winding 5 is disposed upon the core. The transducer head here shown is designed for operation in a push-pull circuit and it is highly desirable, for satisfactory operation of the device into which it is to be incorporated, not only that both halves of the winding be accurately balanced but that all heads employed in the device shall be substantially uniform. The latter desideratum depends, of course, on accurate product control. To insure the former the requirement for accurate balance is met by the use of a bi-filar winding, the two strands of the winding being applied at the same time so that they occupy as nearly as possible the same space. The showing of the winding in the drawing is diagrammatic; actually it is applied in random fashion and consists of a relatively large number of turns of very fine wire. After it is completed, the inner end of one of the strands or filaments of the winding is connected to the outer end of the other, to provide an accurately balanced center tap at the junction.

If the device is to be used in the form in which a relatively long gap may be tolerated, it is now ready to be completely invested in the mold. For this purpose it is first cemented to a supporting arm 7, which is screwed or otherwise secured to a T-slotted support bracket 9. The end terminals 11 of the coil and the center taps 13 are connected to the contacts of a terminal plug 15. Both terminal plug and the support bracket are inserted in the mold in which the investment or "potting" is to take place. As is implied by the drawings, the mold is such as to produce a generally rectangular block of plastic 17.

The mold is provided with a longitudinal groove in the bottom wherein the apex of the triangular core nests, coming in contact with the mold cavity at this point. As a result of this construction of the mold cavity a portion of the core which is eventually to be opposed to the magnetic medium is circumferentially exposed and projects from the body of the block 17 in a ridge 19, the plastic investing the sides of the core but not the face wherein the gap is to be formed. This is best shown in Figs. 1 and 3 of the drawings. The specific material used for investing a head is not an essential feature of the invention. There is a material advantage, however, in using one of the water-white thermo-setting plastics as this permits ready visual inspection of the parts to insure their proper placement, connections, and the like.

When the investment is complete a gap is formed by slotting through the core 1 and ridge 19 as shown. The slotting is accomplished by means of a reciprocating jeweler's saw operating at very slow speed, preferably on the order of ½ stroke per second. In doing the sawing ample quantities of coolant are supplied in order to minimize the heat developed and to avoid mechanical shock to the sensitive magnetic material. Using this technique a jeweler's saw of nominal 5 mil thickness will form a slot or gap 21 which is almost exactly 6 mils wide. The sides of the slot are nearly as smooth as though polished. Even with the careful procedure adopted, however, some of the crystals at the edges are torn and broken, and the magnetic qualities of these crystals are impaired to some extent. As an optional procedure, therefore, the gap may be slightly etched, and since the etchant attacks injured crystals more readily than those which have been undisturbed, the result is a slightly better magnetic performance. This procedure does, however, involve the possibility that the etchant may not be entirely removed, in which case, corrosion will almost certainly occur and impair the magnetic properties of the core more than would the broken crystals. If this optional procedure is adopted, therefore, it must be performed with great care to insure that the corrosive material is entirely washed away.

After the slot is formed, and, if desired, etched, this portion of the device is reinvested. A very small quantity of the plastic is inserted in the gap, the device is inserted either in the original mold or a partial mold designed for the purpose, and recured, leaving the gap entirely filled with plastic. If desired the exposed portion of the core, at the gap, may be honed to remove any final coating of oxide or plastic from the exposed face.

The device is now ready for final assembly. Connecting plug 15 is mated with a contact terminal block 23, secured by a clamp 25 to the upper end of the plastic block 17. A supporting strip 27, carrying mounting screws 29, is inserted in the T-slot of the bracket 9. The upper end of the support strip is bent over to provide an L-shaped end 31, and a differential screw 33 is threaded through this end and a nut (not shown), threaded into the upper end of the support arm 7 and secured to the bracket 9. By means of the differential screw the spacing between the head and the recording medium can be adjusted with a high degree of accuracy.

In the event that a shorter gap is desired than can satisfactorily be formed by the procedure mentioned, the procedure is slightly altered. Instead of investing the entire device in plastic in the original procedure, only the segment of the core opposite the winding 5 is thus invested. The mold used for this purpose may be the same as that in which the final operation is performed, or it may be one containing only a small cavity, grooved at the bottom to form the ridge 19 as before, but filled so that the resulting block of plastic terminates slightly above this ridge. Sawing is then accomplished in the same manner as has already been described, but before the assembly and connection. Two free arms of the core 1 then each carry a small block 35 of plastic. The arms may be flexed to adjust the width of the gap. Experiment has shown that with a core the shape and dimensions shown in the figures, flexure to a degree which will alter the width of the gap by 10 mils will not alter the magnetic properties of the core to a measurable degree. Normally the flexure procedure will not be resorted to unless a narrower gap than that provided by the saw is desired. The readiest way of adjusting a gap length is to insert a shim of non-magnetic material in the gap between the faces of the blocks 35.

Where the adjusted gap is so short that its length approaches or is less than the thickness of one lamination one additional step is desirable. It will be seen that after the core has been slotted one end of each layer faces, across the gap, the other end of the next layer, so that one end of the inner layer and the other end of the outer layer are "free," having no continuous lamination directly opposed thereto. With a six mil gap the length of the slanting path between the two ends of the same lamination is only about 1½ percent longer than the nominal length of the gap. The field in and around the gap is slightly tilted, but this makes no observable difference in the results obtained. With gaps of 2 mils, one mil, or less, the length of path between the ends of the same layer may become several times the nominal length of the gap. If the ends of the spiral are carried up into the winding, so that each lamination end faces another directly across the gap, the increase in effective gap length and the distortion of the field is much less; the flux leaks from one lamination to the next through the much smaller spacing between the layers, and the area throughout which the leakage takes place is distributed along the entire length of the core. The added reluctance of the magnetic circuit due to the spiral form of the coil will be only a few percent of what it would be if transition from one layer to the next all took place at the gap, and the field distortion is not appreciable.

It is desirable, if optimum performance is to be attained, to avoid even this small added reluctance. To do this the tape of which the core is formed is terminated at or near the gap location. In the initial investment of the portion of the core which is to be slotted a shim of the thickness of one lamination is placed in the bottom of the mold, abutted against the outer end of the coil of tape, and is left in place while the core is slotted. After slotting the shim is peeled off, together with any portion of the outer layer projecting past the gap. This leaves a space so that at the same time that the core is flexed to shorten the gap the end to which the shim was applied can be flexed outwardly to bring the two ends of each lamination into alinement. Removal of the shim permits the end of the core to seat in the mold in the new alinement, and the second investment retains the adjustment. Alternatively, the shim may be omitted in the first, partial investment (the tape terminating at the gap as before) and a shim of the proper thickness be inserted in the mold when the final investment is made, to flex the outer end inwardly to effect the alinement.

It will be appreciated from the procedure described that the manufacture of transducer heads of this invention is considerably more elaborate than that involved in making conventional type heads. The justification for such procedure lies in the fact that, for a given length of gap, the resolving power of the heads as herein described is nearly double that of the conventional type head; heads having a 6 mil gap, constructed in accordance with the present invention are used in regular practice to record and to reproduce clearly 112 pulses per inch as contrasted 60 pulses per inch, which proved to be limiting value of conventional type heads with a like length of gap. The reasons for this improved performance may be explained as follows:

Current in coil 5 establishes a magnetomotive force which tends to set up a resultant magnetic flux in an infinite number of paths threading the coil and closed externally to the coil. The intensity of the flux in any path is inversely proportional to the reluctance of that path, or, otherwise stated, the flux intensity in any path is directly proportional to the permeability of the material forming the path and inversely proportional to its length. At the intensity of magnetomotive force employed, the permeability of the core material is several thousand times that of air or the plastic used for the investment of the device. Accordingly, an overwhelming preponderance of the flux resultant from the current in the coil threads the core, the reluctance of which is negligible in comparison to the reluctance of the gap 21.

It is therefore only in the immediate neighborhood of the gap that the permeability of leakage paths, divided by their length, approaches within several orders of magnitude the reluctance of the desired path through the core, and it is therefore only in this immediate neighborhood that there is any tendency whatsoever for the lines of force threading any specific lamination to cross the boundary between two adjacent laminations. The tendency is made smaller by the fact that even though the layer of plastic between the laminations is less than $\frac{1}{10}$ mil, it is easier to induce flux in several tenths of an inch along the laminations than it is to induce an equal amount of flux crossing one of the inner lamination boundaries. Furthermore, in order to supply any tendency for the flux to traverse such boundaries, flux density in the inner and outer laminae must be less than that in the more central laminae. This means that to cause such difference in density, flux must have escaped from the inner and outer layers to follow air paths of greater reluctance; the tendency for this to occur is obviously small.

Since, as a result of the method of formation of the gap, its sides are parallel the lengths of the flux paths are substantially equal, and since, moreover, the cross section of the core is uniform to within a very short distance of the gap, the reluctance per unit length of the core is substantially uniform right up to the gap itself; there is no tapering of the high permeability material to cause increased reluctance in the magnetic path, and therefore greater tendency toward leakage, as the gap is approached. Furthermore, owing to the multiplicity of inter-lamination boundaries, the reluctance of any path transverse to the lay of the laminations is enormously greater than that longitudinally thereof. Consequently, even within a few thousandths of an inch of the actual walls of the gap, there is substantially no tendency for the escape of leakage flux from the core with a consequent formation of fringe fields. The only exception to this situation is the outer layer of the core which may, as a result of the honing, be scarfed off as is shown at 37 of Fig. 4. Even so the paths offered to leakage flux from this outer layer are so much longer and of such higher reluctance than those in the untouched inner layers that the resultant leakage is not more than one or two percent of the total core flux.

At the gap itself there is an abrupt discontinuity in the magnetic circuit. Considering the gap alone, in the absence of recording medium, all paths offered to the flux are of equal, unity permeability. Therefore the flux density along any path will be inversely proportional to the length of the path. The flux density at the geometrical center of the gap will, of course, be the highest, but the lines of force will tend to spread or expand in all directions from this central straight path, surrounding a gap with a sort of halo of flux which may be visualized as a collar surrounding the gap.

Figure 4:
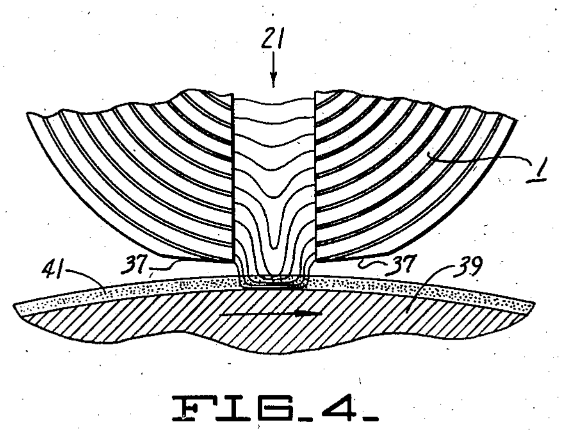
Fig. 4 is a greatly enlarged diagrammatic view of the slotted portion of the core.
Figure 5:
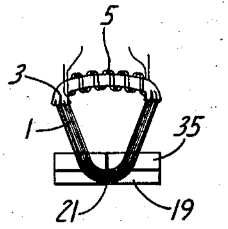
Fig. 5 is a view of a partially invested core prepared for an adjustment of gap lengths.

This situation is again changed when the gap is in proximity to the recording medium as is illustrated in Fig. 4, wherein the shaded area 39 represents a portion of the periphery of a recording drum carrying a layer 41 of magnetizable oxide or other suitable recording medium. Although the permeability of this material 41 does not approach that of the core itself, it is, nonetheless, higher than that of air and a preponderance of the flux will seek a path through the medium. The result is at the edges of the field are quite sharply defined, and that the resulting cell of magnetization is also distinct and clearly resolvable instead of shading off as the result of fringe fields. It may be that the intensity of the flex produced in the medium by a given magnetizing force is not as great as would be produced by a conventional type head using tapered pole-pieces at the approach to the gap, but the sharper definition of the cell and the greater rate of change when moved beneath the gap may result in higher potentials in reproduction than would be the case with more powerfully magnetized cells. It has been found, however, that heads of this invention record and reproduce pulses at at least as high a level as those produced by conventional heads, and, because of their nearly double resolution, decrease the size of the recording medium required to store a given amount of information.

Actually, of course, the medium is moving during the existence of a pulse in the coil 5. For the particular purpose of information storage the essentially rectangular pulses of alternating polarity used have an intensity which is sufficient substantially to saturate a recording layer. Except during the instants of transition from plus to minus, which may be a very small fraction of a microsecond, the record is never neutral. The portion of the track passing out of the field toward the right, in the illustration of Fig. 4, will remain magnetized in the direction of the field at the instant of its passage outward therefrom, but those elements which were in the gap and magnetized in the same direction at the instant of the pulse may be reversed by the opposing, succeeding pulse and, as they pass out from under the gap, will carry the record of its later magnetization. Actually it is possible that an individual portion of the magnetic material might be reversed in polarity several times during its passage across the magnetizing areas; the record it carries will be that corresponding to the field at the trailing edge of the gap, and for purposes of recording the length of the gap is therefore not critical.

In reproducing the record signals this is not necessarily the case. The magnetization induced in the core at any instant will be proportional to the algebraic sum of the intensity of the magnetization of the various individual domains included in the flux paths. The latter will be essentially the same as is the case in recording, but if, at a given instant, the paths embrace one-half of a positive cell and one-half of a negative cell, the resultant flux through the coil 5 will be nil. If one positive and one negative cell are equal in length to the gap, and the cells repeat, there will be no change in flux through the gap and the output will be zero.

In recording by means of a binary code a "positive" pulse represents 1 and a "negative" pulse 0, "positive" and "negative" in this connotation being purely arbitrary, to designate pulses of opposite direction.

In an illustrative case the pulses representative of a single digit of either sign are of substantially 45 microseconds duration, the resulting cells being 9 mils in length.

The output signal is generated only when a change in magnetization is either entering or leaving the gap; i. e., is entering or leaving a position where its field affects the gap. If there were no fringe fields whatsoever, so that a cell of uniform magnetization terminated in a clearly defined geometrical line directly under the leading edge of the gap, and assuming a 6 mil gap, the output voltage produced by the head would be one rectangular pulse three microseconds long produced while the transition from positive to negative magnetization was entering the gap, followed, one and one-half microseconds later, by a corresponding three microsecond pulse as the transition left the gap.

Actually no such ideal condition is ever met; the original pulses, as recorded, have a finite rise time, which causes the intensity of magnetization of the cells to taper off gradually adjacent their ends, which, of itself, would tend to cause a similar flattening out of the slope of the pulse as reproduced. This is greatly accentuated, however, by the effect of fringe fields, and these fields in recording and reproducing heads have a cumulative effect so that instead of getting sharp pulses at the beginning and end of transition they merge and blur to an extent which, in the limit, makes accurate reproduction impossible.

In one sense, fringe fields exist in the present device; as will be seen from Fig. 4 flux from the laminae more remote from the medium enter the latter near the middle of the gap while those from the outer laminae enter adjacent its edges. A transition, therefore, starts to enter the effective gap as it passes beneath the leading edge of the physical structure defining it and continues to enter the gap until it gets to the center thereof. Thereupon it immediately starts to leave the gap, passing out of it completely as it leaves the trailing edge. The effective gap, from the point of view of the magentization of the medium, is therefore materially shorter than the physical gap in the head, because of concentration of flux at the center. This concentration will be much greater than indicated in the diagram, where only a few laminae are shown, the actual number used will vary, with the size of head from 50 to 100. With the conventional structure, however, the concentration of lines of force between the edges of the physical gap is nearly constant and the fringing effect takes place very largely externally thereto. The effect of this has already been mentioned; heads of the structure here described have nearly twice the resolving power of conventional heads.

The diagram of Fig. 4 is, of course, only a rough approximation of the actual condition since plotting such an arrangement from actual experimental data is extremely difficult. Nonetheless it gives a fairly accurate qualitative picture of what occurs, as determined by overall performance. The proportions shown in the figure are approximately those of a 6 mil gap, spaced 1 mil from the surface of the medium. With the shorter gaps described above the effect is substantially the same as long as the relative width of the gap and the separation of the gap from the medium remain constant. Greater separations lead to lower field intensities but the qualitative factors involved remain the same.

With any type of transducer head wherein longitudinal magnetization of the medium is used, shortening the gap leads to higher resolution but lower sensitivity. For the specific purpose which the invention was originally designed to meet it has been found possible to use the simpler method of construction described, resulting in a wider gap, for both recording and pick-up purposes. It is quite generally known in the art that wider gaps may be successfully used for recording than for reproduction or pick-up, with the same limits of frequency response or resolution. It should therefore be apparent that even for the general type of data storage duty here considered in some detail, their resolution can be increased by using the adjusted gaps. In the case of recordation of speech or music the use of the gap of one-half mil or less would be normal procedure. One of the advantages of the structure here disclosed is that it may be modified to meet specific conditions, and hence the specific features and values given are to be considered as illustrative only.

Throughout this specification and claims the term "cylindrical" is used in its broad geometrical sense, denoting a curved surface all elements of which are mutually parallel. It is not limited to circular cylinders but includes spiral and quasi-polygonal forms as well.

It will also be recognized that while the term "a gap" is used in referring to the core structure as a whole, since the structure is laminated the single gap in the core necessarily includes individual gaps in each of the constituent laminations. In ordinary practice predominately ferro-magnetic circuits are considered as a whole; in the present case the component laminations are important and hence the distinction between "a gap" in the core structure and "gaps" in the laminations is emphasized.

I claim:

1. A transducer head for use with a magnetizable recording medium comprising a ferro-magnetic core structure forming a loop complete except for a single gap having substantially parallel sides, said core structure comprising a plurality of substantially concentric cylindrical laminations, and a winding disposed on a segment of said core structure displaced from said gap.

2. A transducer head for use with a magnetizable recording medium comprising a generally annular ferromagnetic core having a single substantially radial slot therethrough and a winding disposed on the unslotted portion of said core, said core comprising a plurality of cylindrical laminations each forming a magnetic circuit which is complete except for a single gap formed by said slot and all of the magnetic paths in any one lamination being of substantially equal length and the gaps in each of said magnetic circuits being of substantially equal length.

3. A transducer head for use with a magnetic recording medium comprising a core composed of a plurality of concentric laminations of high-initial-permeability alloy, said laminations terminating in alined gaps of uniform length, and a bifilar winding disposed on said core at a location displaced from said gap, the inner end of one filament of said winding being connected to the outer end of the other to provide an accurately balanced center tap.

References Cited in the file of this patent

UNITED STATES PATENTS

| | | |
|---|---|---|
| 2,456,767 | Camras | Dec. 21, 1948 |
| 2,459,299 | West | Jan. 15, 1949 |
| 2,468,601 | Long | Apr. 26, 1949 |
| 2,523,576 | Kornei | Sept. 26, 1950 |
| 2,564,445 | Zenner | Aug. 7, 1951 |
| 2,612,681 | Camras | Oct. 7, 1952 |
| 2,754,568 | Kornei | July 17, 1956 |